May 26, 1959 P. H. SCHEFFLER, JR 2,888,097
LUBRICATION SYSTEM
Filed July 12, 1957
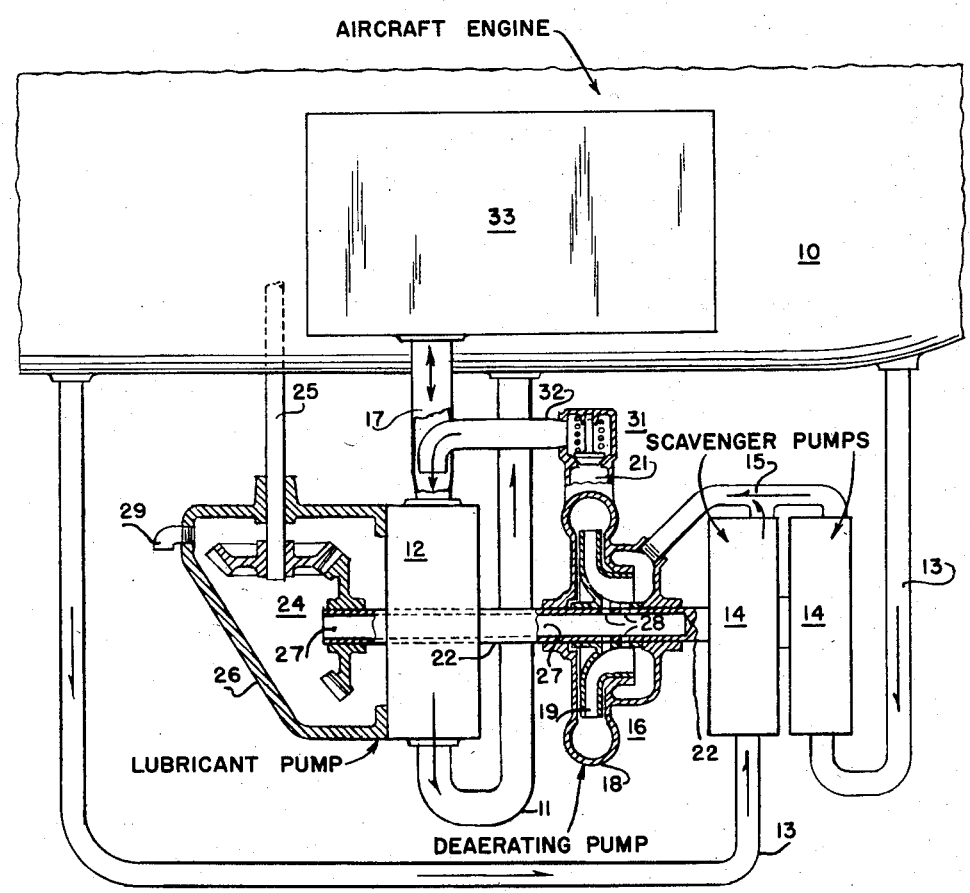
INVENTOR
PAUL H. SCHEFFLER, JR.
BY
ATTORNEY ured by the engine, excess lubricant is returned to the reservoir from the lubricant pump, as will appear hereinafter.

United States Patent Office
2,888,097
Patented May 26, 1959

2,888,097
LUBRICATION SYSTEM

Paul H. Scheffler, Jr., Kansas City, Mo., assignor to Westinghouse Electric Corporation, East Pittsburgh, Pa., a corporation of Pennsylvania Application July 12, 1957, Serial No. 671,508

4 Claims. (Cl. 184—6)

This invention relates to lubricating systems, more particularly to a lubricating system for an aircraft engine, and it has for an object to provide an improved system of this kind.

Further objects of the invention are to provide improved means to deaerate the oil in a system of the class set forth and, to reduce the capacity and simplify the construction of the oil reservoir used with such systems.

A further object of the invention is to preclude interruption of oil flow to the engine during negative G, inverted flight, and steep dives and climbs.

In conventional aircraft lubrication systems, the lubricant supply pump inlet is piped to the oil reservoir and the scavenged oil and air which becomes entrained in the oil are returned to the reservoir to complete the cycle. Means is provided to deaerate the oil and to vent the air or other gas from the reservoir. This arrangement necessitates a relatively large amount of air space in the reservoir and usually a complex system of baffles and vent tubes. In addition, increased oil volume, as well as an involved structure for withdrawing the oil, must be provided to insure a continuous supply to the lubricant pump during inverted flight and dives and climbs.

In accordance with the present invention, the function of separating the air and oil is transferred from the reservoir to the lubricant and scavenge pump combination so that the reservoir functions only as a "make-up" oil supply. In accordance with this arrangement, the lubricant pump is directly supplied with oil by a centrifugal type of pump interposed between the lubricant pump and the scavenge pump. The flow of lubricant from the scavenge pump is directed into the centrifugal pump inlet and is discharged by the centrifugal pump through a check valve to the inlet of the lubricant pump. The opening or cracking pressure of the check valve is so adjusted that the low density air or gas entering the centrifugal pump will not develop sufficient pressure to open the check valve. Gas admitted to the centrifugal pump is discharged therefrom through a venting passage preferably formed in the hollow shaft of the pump. Preferably, the hollow shaft discharges the gas into the casing of gearing which serves to drive the various pumps. The gearing may be vented overboard to the ambient atmosphere in a conventional manner.

Oil admitted to the centrifugal pump, because of its greater density, develops sufficient pressure to open the check valve and will enter the lubricant pump substantially free of air. The oil reservoir is connected in parallel with the centrifugal pump and is, of course, in open communication with the inlet of the lubricant pump. Accordingly, during periods of acceleration of the engine, when the lubricant pump requires more lubricant than is being returned by the scavenge pump, make-up oil will be withdrawn from the reservoir. Also, any oil consumption will be made up by the reservoir. During engine deceleration when the engine requires less lubricant than is being returned, excess lubricant is returned to the reservoir by the centrifugal pump.

The foregoing and other objects are effected by the invention as will be apparent from the following description and claims taken in connection with the accompanying drawings, forming a part of this application, in which:

The single figure of the drawing is a diagrammatic view showing a lubrication system constructed and arranged in accordance with the invention and applied to an aircraft engine.

Referring now to the drawing, a lubricating system constructed and arranged in accordance with the invention is shown applied to an aircraft engine, indicated generally at 10. Lubricating oil is supplied under pressure to the engine 10 through a conduit 11 by means of a lubricant pump 12 of any suitable construction. Return oil is withdrawn from the engine 10 through conduits 13 by a pair of scavenge pumps indicated at 14 and having their outlets communicating with a manifold 15.

A centrifugal pump shown at 16 is interposed between the scavenge pumps 14 and the lubricant pump 12 for translating oil from the scavenge pumps 14 to an inlet conduit 17 of the lubricant pump 12. As set forth hereinafter, this centrifugal pump 16 also functions to deaerate the oil. As shown, the centrifugal pump 16 includes a casing 18 and a pump runner 19 rotatable therein. The casing 18 includes the usual volute which terminates in a discharge passage 21. As shown, the runner 19 is driven by a hollow shaft 22 which also serves to drive the lubricant pump 12 and the scavenge pumps 14. The shaft 22 is rotated by a set of beveled gears 24 driven by a jackshaft 25, the latter being rotated, in any suitable manner, by the engine 10. A casing 26 encloses the gears in accordance with well understood practice. As shown, the hollow shaft 22 includes an axial passage 27 terminating in and communicating with the interior of the gear casing 26.

In the operation of many circulating lubrication systems, the oil entrains air and becomes foamy, rendering it difficult to pump. Accordingly, it has been the practice to deaerate the oil at some stage in its circulating cycle, usually in a storage reservoir by means of baffles and vent tubes. In accordance with the present invention, deaeration of the oil is carried out in the centrifugal pump 16. Air openings 28 are provided in the rotating element of the pump and connect the region of the pump casing 18 adjacent the pump inlet with the passage 27. Air or other gas passing through the openings 28 to the passage 27, as described hereinafter, enters the gear casing 26 and is discharged overboard to the ambient atmosphere through a suitable vent 29. In order to preclude the discharge of gas to the inlet conduit 17 of the lubricant pump 12, a check valve 31, spring biased to closed position, controls flow of fluid from the centrifugal pump 16 to its discharge conduit, indicated at 32 and communicating with the inlet conduit 17 of the pump 12. The check valve 31 is so adjusted that it is opened by the high pressure of the relatively dense oil circulated in the pump 16 but is maintained closed if subjected to the low pressure of low density gas circulated in the pump. Accordingly, gas entering the centrifugal pump 16 passes inwardly through the openings 28 to the passage 27 and is vented overboard as described. In this connection, it is understood that when oil and air enters the pump 16, the high density oil moves outwardly in the casing for discharge through the valve 31 and the low density air is forced inwardly for discharge through the openings 28.

The inlet conduit 17 of the lubricant pump 12 is connected to an oil reservoir 33 and receives oil therefrom at times when the flow from the scavenge pumps 14 is insufficient. Also, during periods when the flow from the scavenge pumps 14 is greater than that required by the lubricant pump 12, excess oil passes from the conduit 32 to the reservoir 33. The reservoir 33 is, therefore, a source of "make up" oil for the system and floats on the system in parallel with the pump 16 to deliver oil during peak demands, such as when the engine 10 is accelerated. During reduced demands, such as when the engine 10 is decelerated, excess oil translated by the pump 16 is returned to the reservoir. The reservoir 33 also functions to make up oil consumed during all periods of operation.

By connecting the discharge conduit for the scavenged oil directly to the inlet of the lubricant pump 12, continuous supply of oil to the latter is maintained during negative G, inverted flight, and steep dives and climbs, whereas in systems where the supply to the lubricant pump is solely from the reservoir, variation in the rate of supply and interruptions of the supply may obtain during such flying conditions. Furthermore, by circulating the oil as described, a relatively small oil reservoir may be employed, as the "make-up" supply of oil contained therein is relatively small and the deaerating apparatus usually associated with the reservoir is dispensed with. A further advantage of this system of lubricating an aircraft engine is that high altitude operation is independent of reservoir pressurization.

While the invention has been shown in but one form, it will be obvious to those skilled in the art that it is not so limited, but is susceptible of various changes and modifications without departing from the spirit thereof.

What is claimed is:

1. In a lubrication system, the combination with apparatus to be lubricated, of pumping means for delivering lubricant to the apparatus and having an inlet for lubricant, a scavenge pump for withdrawing lubricant from said apparatus and having a discharge outlet for the lubricant, a centrifugal pump having an inlet arranged to receive lubricant and gas from said outlet of the scavenge pump, a conduit conveying lubricant from the centrifugal pump to the inlet of said pumping means, a reservoir for lubricant openly communicating with said conduit and the inlet of the pumping means, a valve connected in said conduit, said valve being responsive to the pressure of fluid translated within the centrifugal pump for controlling flow of lubricant from the pump to said conduit, said pressure responsive valve effecting delivery of lubricant to the conduit when subjected to the relatively high pressure developed by high density lubricant and terminating delivery of fluid to the conduit when subjected to the relatively low pressure developed by lower density gas, means for driving the lubricant pumping means, the scavenge pump and the centrifugal pump, and means for venting gas from adjacent the inlet of the centrifugal pump to the ambient atmosphere.

2. In a lubrication system, the combination with apparatus to be lubricated, of pumping means for delivering lubricant to the apparatus and having an inlet for lubricant, a scavenge pump for withdrawing lubricant from said apparatus and having a discharge outlet for the lubricant, a centrifugal pump having an inlet arranged to receive lubricant and gas from said outlet of the scavenge pump, said centrifugal pump having a discharge outlet, a conduit connected to the outlet of said centrifugal pump for conveying lubricant from the centrifugal pump to the inlet of said pumping means, a reservoir for lubricant openly communicating with said conduit and the inlet of the pumping means, a check valve connected in the conduit adjacent the outlet of said centrifugal pump and subjected to pressure of fluid delivered by the centrifugal pump, means biasing the check valve to closed position, said check valve being opened when subjected to the relatively high pressure of high density lubricant and closed when subjected to the relatively low pressure of low density gas, means for driving the lubricant pumping means, the scavenge pump and the centrifugal pump and means for venting gas from adjacent the inlet of the centrifugal pump to the ambient atmosphere.

3. In a lubrication system for an aircraft engine, the combination of a lubricant pump for delivering lubricant to the engine and having an inlet port, a scavenge pump for withdrawing lubricant from the engine and having a discharge port, a centrifugal pump having an inlet connected to the discharge port of the scavenge pump for receiving lubricant and gas therefrom, a conduit conveying lubricant from the centrifugal pump to the inlet port of said lubricant pump, a reservoir for lubricant in open communication with said conduit and the inlet port of the lubricant pump, a check valve connected in said conduit and subjected to the pressure of fluid discharged by the centrifugal pump, means biasing the check valve closed in opposition to the fluid pressure developed by the centrifugal pump, said check valve being opened when subjected to the relatively high pressure of high density lubricant and closed when subjected to the relatively low pressure of lower density gas, means for driving the lubricant, scavenge and centrifugal pumps including a shaft having a passage therein, gearing driven by the engine for rotating the shaft, a casing for the gearing communicating with said passage, means for conveying gas from the region of the centrifugal pump adjacent its inlet through said passage to the casing of said gearing, and means for venting the gas from the casing overboard to the ambient atmosphere.

4. In a lubrication system for an aircraft engine, the combination of a lubricant pump for delivering lubricant to the engine and having an inlet port, a scavenge pump for withdrawing lubricant from the engine and having a discharge port, a centrifugal pump having an inlet connected to the discharge port of the scavenge pump for receiving lubricant and gas therefrom, a conduit conveying lubricant from the centrifugal pump to the inlet port of said lubricant pump, a reservoir for lubricant in open communication with said conduit and the inlet port of the lubricant pump, means responsive to the pressure developed by fluid contained within the centrifugal pump for controlling delivery of lubricant to said conduit, said pressure responsive means effecting delivery of lubricant to the conduit when subjected to the relatively high pressure developed by high density lubricant and terminating supply of fluid to the conduit when subjected to the relatively low pressure developed by lower density gas admitted to the centrifugal pump, means for driving the lubricant, scavenge and centrifugal pumps including a shaft having a passage therein, gearing driven by the engine for rotating the shaft, a casing for the gearing communicating with said passage, means for conveying gas from the region of the centrifugal pump adjacent its inlet through said passage to the casing of said gearing, and means for venting the gas from the casing overboard to the ambient atmosphere.

References Cited in the file of this patent

UNITED STATES PATENTS

| | | |
|---|---|---|
| 2,482,806 | Stahn | Sept. 27, 1949 |
| 2,747,514 | Edwards | May 29, 1956 |

FOREIGN PATENTS

| | | |
|---|---|---|
| 905,642 | France | Apr. 3, 1945 |